(12) United States Patent
Kwon et al.

(10) Patent No.: US 11,909,751 B2
(45) Date of Patent: Feb. 20, 2024

(54) ANOMALY DETECTION METHOD BASED ON IOT AND APPARATUS THEREOF

(71) Applicant: FOUNDATION OF SOONGSIL UNIVERSITY-INDUSTRY COOPERATION, Seoul (KR)

(72) Inventors: Minhae Kwon, Seoul (KR); Hyoseon Kye, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 344 days.

(21) Appl. No.: 17/528,203

(22) Filed: Nov. 17, 2021

(65) Prior Publication Data

US 2022/0159021 A1    May 19, 2022

(30) Foreign Application Priority Data

Nov. 18, 2020 (KR) .................. 10-2020-0154660

(51) Int. Cl.
*H04L 9/40* (2022.01)
*H04L 67/12* (2022.01)
*H04L 43/16* (2022.01)

(52) U.S. Cl.
CPC .......... *H04L 63/1425* (2013.01); *H04L 43/16* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2020/0007563 | A1* | 1/2020 | Leibman | H04L 41/0893 |
| 2020/0028862 | A1* | 1/2020 | Lin | H04L 63/104 |
| 2020/0117177 | A1* | 4/2020 | Cantrell | G06F 18/2433 |
| 2020/0244677 | A1* | 7/2020 | Abbaszadeh | H04L 63/1425 |
| 2020/0334596 | A1* | 10/2020 | Ramaswamy | G06Q 10/0633 |
| 2021/0385238 | A1* | 12/2021 | Akella | G06F 16/245 |

FOREIGN PATENT DOCUMENTS

| | | |
|---|---|---|
| JP | 10-260722 A | 9/1998 |
| KR | 10-1468560 B1 | 12/2014 |
| KR | 10-1573413 B1 | 12/2015 |
| KR | 10-2020-0036599 A | 4/2020 |

* cited by examiner

*Primary Examiner* — Jeffrey R Swearingen
(74) *Attorney, Agent, or Firm* — Revolution IP, PLLC

(57) ABSTRACT

An anomaly detection method includes searching for one principal component axis by analyzing a normal data set collected in time series from a plurality of IoT devices by using a principal component analysis technique, setting a center point of the principal component, receiving a currently measured measurement data set from the plurality of IoT devices, acquiring a linear transformation data set having a plurality of projection points as elements by projecting a plurality of measurement data which is each element in the measurement data set onto the principal component axis, calculating a Mahalanobis distance between the projection point and the central point, and detecting whether or not data of the IoT devices is abnormal by comparing the Mahalanobis distance calculated for each element with a threshold.

12 Claims, 4 Drawing Sheets

[FIG. 1]
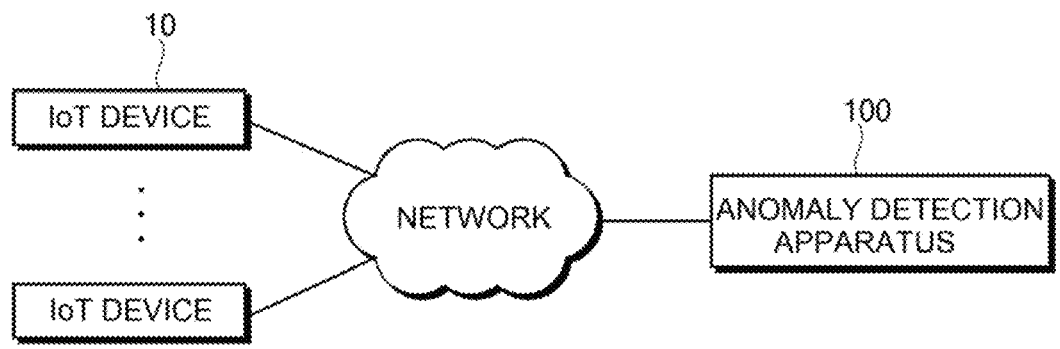
[FIG. 2]
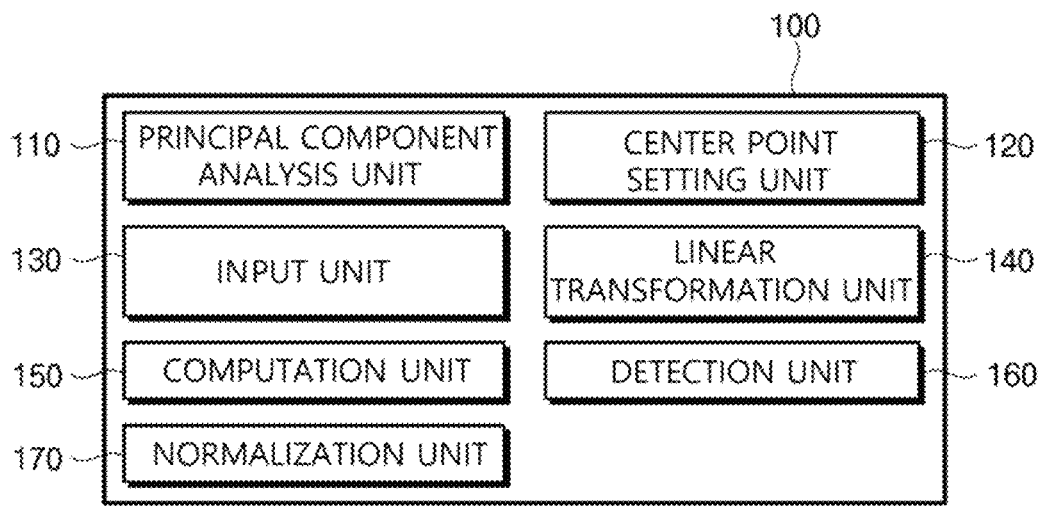

[FIG. 3]
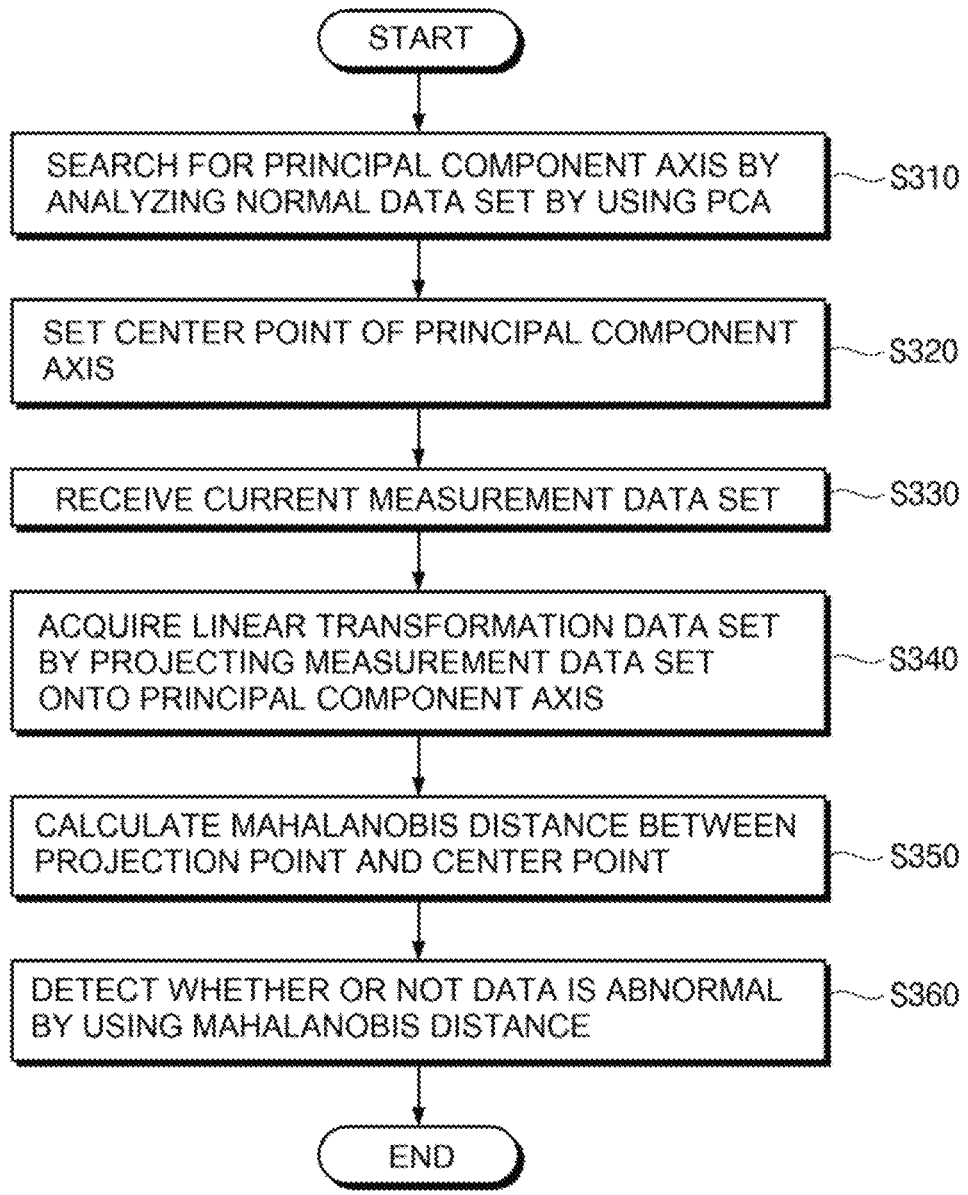

[FIG. 4]
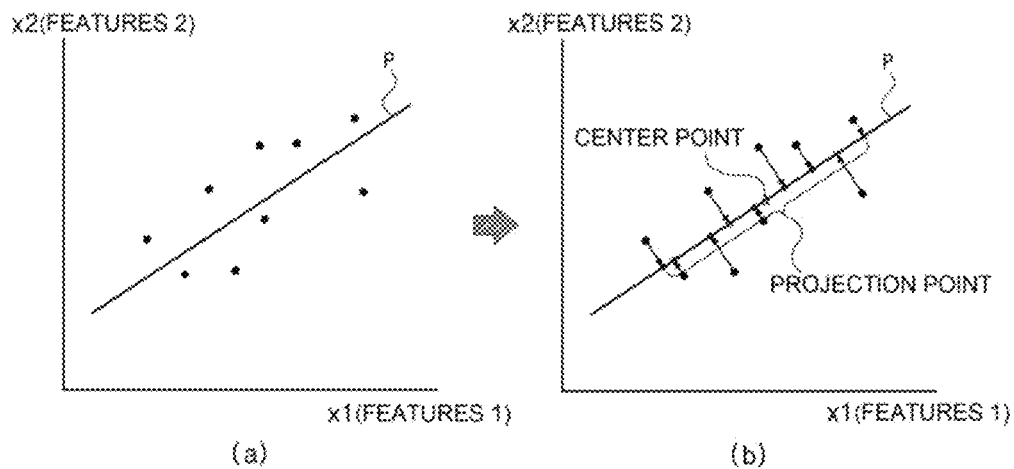
[FIG. 5]
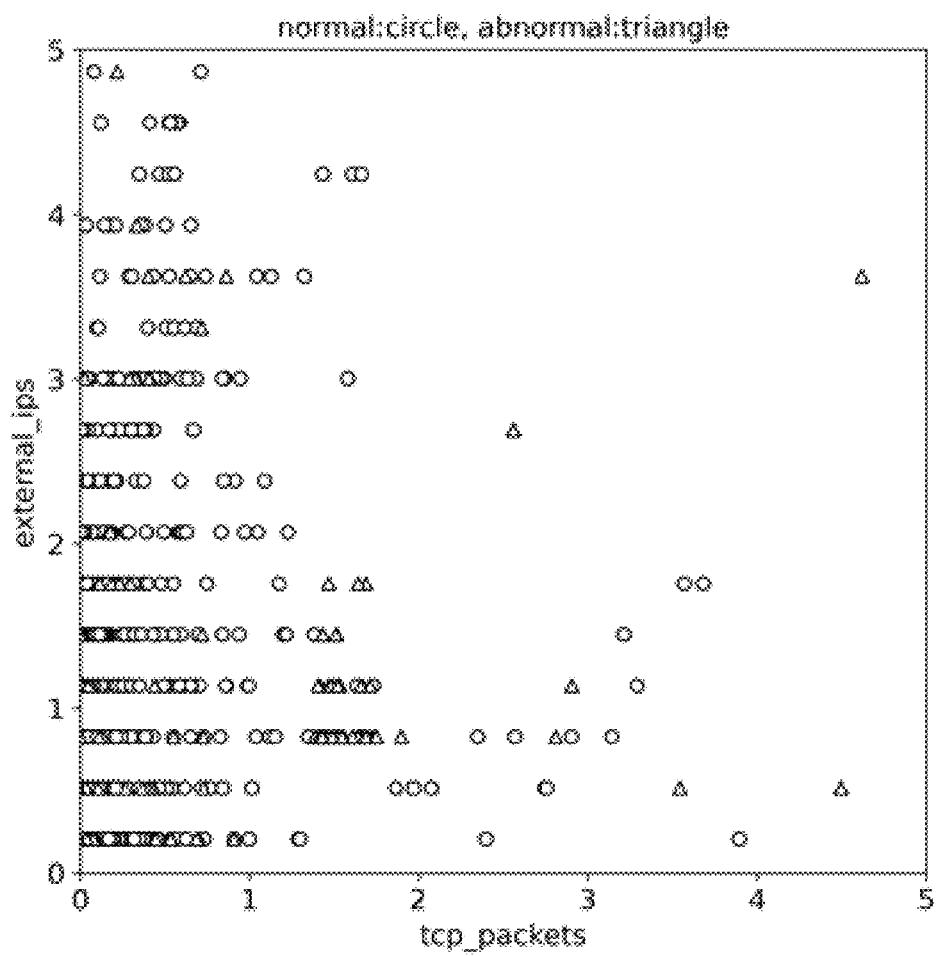

[FIG. 6]
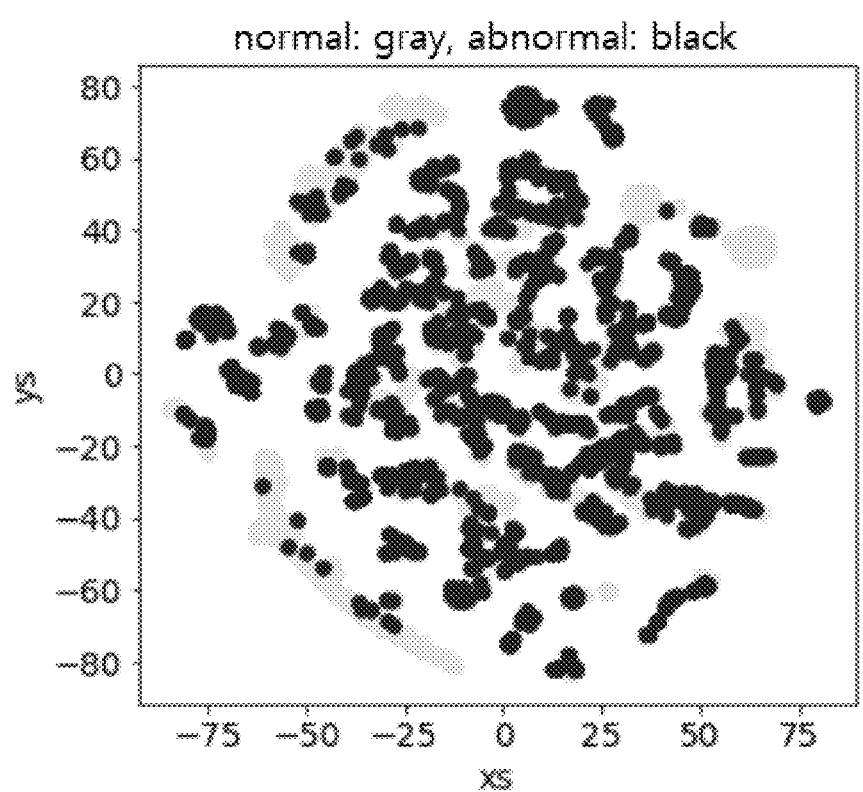

ANOMALY DETECTION METHOD BASED ON IOT AND APPARATUS THEREOF

CROSS-REFERENCE TO RELATED APPLICATIONS

The present application claims priority under 35 U.S.C 119(a) to Korean Patent Application No. 10-2020-0154660, filed on Nov. 18, 2020, which is incorporated herein by reference in its entirety.

BACKGROUND

1. Technical Field

The present disclosure relates to an anomaly detection method based on Internet of things (IoT) and apparatus thereof, and more particularly, to an anomaly detection method based on IoT capable of detecting an abnormal signal with low complexity and apparatus thereof.

2. Related Art

An IoT era starts in which most things used in real life are connected to the Internet, low-spec IoT devices such as smart light bulbs and sensors that may be remotely operated through the Internet are being released.

Accordingly, development of open sources such as ThingsBoard, IoTivity, and Open Air Interface is being actively conducted. Although innovatively developed, the open sources have disadvantages of being very vulnerable to security.

However, the low-spec IoT devices have low computation capacity and low memory, thereby having many difficulties in using the existing security system. An autoencoder which is a representative anomaly detection technology based on machine learning has high computation complexity as a depth (number of layers) and a width (number of hidden nodes per layer) of a neural network increase, and thus, there are many difficulties for the autoencoder to be applied to low-spec IoT devices.

A technology that is background of the present disclosure is disclosed in Korean Patent No. 10-1573413 (published on Dec. 1, 2015).

SUMMARY

The present disclosure provides an anomaly detection method based on IoT capable of performing anomaly detection with low complexity even in a low-spec IoT device and apparatus thereof.

According to an aspect of the present disclosure, an anomaly detection method based on IoT includes searching for one principal component axis maximizing variance of data by analyzing a normal data set collected in time series from a plurality of IoT devices by using a principal component analysis technique, setting a center point of the principal component axis based on a result of projecting a plurality of normal data which is each element in the normal data set onto the principal component axis, receiving a currently measured measurement data set from the plurality of IoT devices, acquiring a linear transformation data set having a plurality of projection points as elements by projecting a plurality of measurement data which is each element in the measurement data set onto the principal component axis, calculating a Mahalanobis distance between the projection point which is each element in the linear transformation data set, and the set central point, and detecting whether or not data of the IoT devices is abnormal by comparing the Mahalanobis distance calculated for each element with a threshold.

In addition, in detecting whether or not data of each of the IoT devices is abnormal, when the calculated Mahalanobis distance is greater than the threshold, data of the IoT devices corresponding to a relevant element may be determined to be in an abnormal state.

In addition, in setting the center point, an average value of projection points obtained by projecting normal data which is each element in the normal data set onto the principal component axis may be set as a center point of the principal component axis.

In addition, the anomaly detection method may further include normalizing the measurement data which is each element of the measurement data set by using mean and variance previously acquired from normal data of the same type as a corresponding element, wherein, in acquiring the linear transformation data set, the linear transformation data set may be acquired by projecting the normalized measurement data onto the principal component axis.

In addition, in searching for the principal component axis, after the normal data which is each element included in the normal data set is normalized by using the mean and variance of the normal data of the same type as the corresponding element, the normalized normal data set may be analyzed by using the principal component analysis technique.

In addition, in calculating the Mahalanobis distance, the Mahalanobis distance may be calculated by using following equation:

$$f_{MMD}(\hat{X}) = \sqrt{(\hat{X}-\mu)\text{cov}^{-1}(\hat{X})(\hat{X}-\mu)^T}$$

where $\hat{X}$ is the linear transformation data set having a plurality of projection points as elements, $\mu$ is the center point, $\text{cov}^{-1}(\hat{X}) = (\hat{X}-\mu)^T(\hat{X}-\mu)/N$, N is the number of samples of the measurement data, and T is a transposed matrix.

According to another aspect of the present disclosure, an anomaly detection apparatus based on IoT includes a principal component analysis unit configured to search for one principal component axis maximizing variance of data by analyzing a normal data set collected in time series from a plurality of IoT devices by using a principal component analysis technique, a center point setting unit configured to set a center point of the principal component axis based on a result of projecting a plurality of normal data which is each element in the normal data set onto the principal component axis, an input unit configured to receive a currently measured measurement data set from the plurality of IoT devices, a linear transformation unit configured to acquire a linear transformation data set having a plurality of projection points as elements by projecting a plurality of measurement data which is each element in the measurement data set onto the principal component axis, a computation unit configured to calculate a Mahalanobis distance between the projection point which is each element in the linear transformation data set, and the set central point, and a detection unit configured to detect whether or not data of the IoT devices is abnormal by comparing the Mahalanobis distance calculated for each element with a threshold.

In addition, the anomaly detection apparatus may further include a normalization unit configured to normalize the measurement data which is each element of the measurement data set by using mean and variance previously acquired from normal data of the same type as a corresponding element, wherein the linear transformation unit may acquire the linear transformation data set by projecting the normalized measurement data onto the principal component axis.

In addition, the normalization unit may normalize the normal data which is each element included in the normal data set by using the mean and variance of the normal data of the same type as the corresponding element, and the principal component analysis unit may analyze the normalized normal data set by using the principal component analysis technique.

BRIEF DESCRIPTION OF THE DRAWINGS

Various embodiments of the present disclosure will become more apparent in view of the attached drawings and accompanying detailed description, in which:

FIG. 1 is a diagram illustrating a system to which an anomaly detection apparatus according to an embodiment of the present disclosure is applied;

FIG. 2 is a diagram illustrating a configuration of the anomaly detection apparatus according to the embodiment of the present disclosure;

FIG. 3 is a diagram illustrating an anomaly detection method using FIG. 2;

FIG. 4 illustrates diagrams of results of setting a center point by projecting a normal data set onto a principal component axis in an embodiment of the present disclosure;

FIG. 5 is a diagram illustrating original data according to a raw feature used for a performance test of the present disclosure; and FIG. 6 is a diagram illustrating a result of performing t-SNE in which data in a close distance is grouped by transforming the original data illustrated in FIG. 5 into a nonlinear method.

DETAILED DESCRIPTION OF THE EMBODIMENTS

Embodiments of the present disclosure will be described in detail with reference to the accompanying drawings such that those skilled in the art to which the present disclosure belongs may easily implement the embodiments. However, the present disclosure may be embodied in various different forms and is not limited to the embodiments described herein. In order to clearly describe the present disclosure, parts irrelevant to the description are omitted in the drawings, and similar reference numerals are attached to similar portions throughout the specification.

Throughout the specification, when a portion is said to be "connected" with another portion, this includes not only "directly connected" but also "electrically connected" with another element in the middle. In addition, when a portion "includes" a certain component, this means that other components may be further included, rather than excluding the other components, unless otherwise stated.

The present disclosure proposes a low-complexity anomaly detection technique based on principal component analysis (PCA).

FIG. 1 is a diagram illustrating a system to which an anomaly detection apparatus according to an embodiment of the present disclosure is applied.

Referring to FIG. 1, a system according to an embodiment of the present disclosure includes a plurality of IoT devices 10 and an anomaly detection apparatus 100 connected thereto. The abnormality detection apparatus 100 may be connected to the plurality of IoT devices 10 through a network. Here, the network may be a wired network, a wireless network, or a network in which the wired network and the wireless network are combined.

The anomaly detection apparatus 100 may receive data sensed by each IoT devices 10 in real time and detect whether or not the data is abnormal based on principal component analysis. Here, the anomaly detection system is not limited to the form of FIG. 1, and the anomaly detection apparatus 100 and the respective IoT devices 10 may also be implemented by being included in one single module.

In the embodiment of the present disclosure, the anomaly detection apparatus 100 performs principal component analysis by using normal data (hereinafter, referred to as normal data) previously collected from the plurality of IoT devices 10. Based on a result of the principal component analysis, whether the sensed data currently received from the IoT devices 10 in real time is normal data belonging to a normal category (pattern) or abnormal data may be quickly detected with low complexity.

As a simple example, principal component analysis of sensed data (normal data) received in time series under normal everyday situations from the respective IoT devices that sense the use amount of water, gas, and electricity of a household where the elderly living alone live is performed, and based on this, it is possible to detect in real time whether or not the sensed data measured in real time from then belongs to a normal pattern. By using this, when an abnormal pattern occurs such as a sharp decrease or rapid increase in use amount due to personal abnormality, carelessness, or so on, the abnormal pattern is immediately detected to cause a prompt follow-up response to be made.

FIG. 2 is a diagram illustrating a configuration of the anomaly detection apparatus according to the embodiment of the present disclosure, and FIG. 3 is a diagram illustrating an anomaly detection method using FIG. 2.

Referring to FIGS. 2 and 3, the anomaly detection apparatus 100 includes a principal component analysis unit 110, a center point setting unit 120, an input unit 130, a linear transformation unit 140, a computation unit 150, a detection unit 160, and a normalization unit 170. Here, operations of the respective units 110 to 170 and a data flow between the respective units may be controlled by a controller (not illustrated).

First, the principal component analysis unit 110 analyzes normal data (hereinafter, referred to as normal data) previously collected from the plurality of IoT devices 10 that are anomaly detection targets by using a principal component analysis technique to search for an axis maximizing dispersion of data. (S310).

The principal component analysis unit 110 analyzes a normal data set collected in time series from the plurality of IoT devices by using a principal component analysis technique to search for one principal component axis that may best represents data.

Principal component analysis (PCA) is a method of reducing a dimension (number of features) of data by analyzing an axes that well represents a degree of dispersion of the given data. Here the number of features corresponds to the number of collected data items. This is related to sense data of different features for each IoT device.

The collected normal data set X has a matrix structure and may be represented by Equation 1.

$$X = x_{nm}(n=1,2,\ldots,N, m=1,2,\ldots M), X \in \mathbb{R}^{N \times M} \quad \text{Equation 1}$$

Here, one data set X has N×M $x_{nm}$ as elements. In this case, N is the number of normal data samples (pointers), and M is the number of data items collected at one time and indicates the number of features. If there are a total of three collected data items, M=3. Of course, M may be at least 2 or more. As such, it may be seen that one data set consists of N×M data. Here, the collected data has various ranges of data values for each data item (each device), and thus, a normalization process for normal data is performed to resolve such a difference.

Equation 2 indicates that normal data $x_{nm}$, which is each element included in the normal data set X, is normalized by using mean and variance of the normal data. This may be performed for each data item, that is, between normal data of the same type.

$$\tilde{x}_{nm} = \frac{x_{nm} - \mu_m}{\sigma_m} \quad \text{Equation 2}$$

Here, $\tilde{x}_{nm}$ corresponds to normalized normal data, and $x_{nm}$ is normal data before normalization and corresponds to raw data. $\mu_m$ and $\sigma_m$ represent mean and variance obtained from normal data of the same type within the normal data set X.

For example, each of the first normal data is normalized to a value within a set range by using means and standard deviation of the first normal data collected from a first IoT device. In the same way, second normal data collected from a second IoT device is normalized by using mean and standard deviation of the second normal data.

The normalization unit 170 normalizes the normal data which is each element included in the normal data set X by using means and variance of the normal data of the same type as a relevant element to obtain a normalized normal data set $\tilde{X}$.

The normalized normal data set $\tilde{X}$ may be defined by Equation 3 below.

$$\tilde{X} = \tilde{x}_{nm}(n=1,2,\ldots,N, m=1,2,\ldots,M), \tilde{X} \in \mathbb{R}^{N \times M} \quad \text{Equation 3}$$

Here, $\tilde{X}$ uses $\tilde{x}_{nm}$ as an element and also consists of N×M data.

The principal component analysis unit 110 analyzes the normalized normal data set $\tilde{X}$ received from the normalization unit 170 by using a principal component analysis technique and selects therefrom one axis that may best represent a pattern of the normal data.

In the embodiment of the present disclosure, a linear transformation vector that well represents features of the normal data is found through singular value decomposition (SVD).

The SVD is a method of decomposing a scaled data matrix into three matrix products represented by Equation 4 in order to analyze principal components of data.

$$\tilde{X} = U\Sigma V^T \quad \text{Equation 4}$$

Here, $U \in \mathbb{R}^{N \times N}$ is an orthogonal matrix as a left singular vector, $\Sigma \in \mathbb{R}^{N \times P}$ is a diagonal matrix having a singular value, $V \in \mathbb{R}^{M \times P}$ an orthogonal matrix as a right singular vector, and T denotes a transposed matrix. P is the number of linear transformation vectors designed through the SVD.

Energy values of the left singular vector U and the right singular vector V are always 1. That is, $UU^T = I$ and $VV^T = I$ are always satisfied.

In the embodiment of the present disclosure, a case of P<M is considered to reduce a dimension of data to minimize computation complexity. When P=p<M in which a dimension of data is reduced from M to p, the right singular vector $V_p$ may be represented by Equation 5.

$$V_p = [v_1, v_2, \ldots, v_p], V_p \in \mathbb{R}^{M \times p} \quad \text{Equation 5}$$

Here, respective vectors $v_1, v_2, \ldots, v_p$ are unit vectors of a new principal component subspace found to efficiently represent data. In this case, the respective vectors of Equation 5 are arranged in the order that has the greatest influence on approximating the data.

As such, the principal component analysis unit 110 arranges elements in the right singular vector in the order of the most important vector to describe data.

In the embodiment of the present disclosure, a dimension is reduced by using only one principal component axis (P=p=1) that best represents a degree of dispersion of data to minimize computation complexity, and thus, $V_1 = v_1$. In this way, a first column that is the greatest principal component vector of the right singular vector $V_p$ is defined as $v_1 \in \mathbb{R}^{M \times 1}$.

In this way, the principal component analysis unit 110 searches for one principal component axis that maximizes variance of data by performing principal component analysis of the normal data set.

Thereafter, the center point setting unit 120 sets a center point of the principal component axis based on a result of projecting a plurality of normal data, which are respective elements in the normal data set, onto the principal component axis (S320).

Here, the center point setting unit 120 may receive a linear transformation result of the normal data set from the linear transformation unit 140 and set a center point by using the received result.

The linear transformation unit 140 linearly transforms each data in the normalized normal data set $\tilde{X}$ by using the previously obtained $V_1$ according to a method of Equation 6.

$$\hat{X} = \tilde{X} \cdot v_1 \quad \text{Equation 6}$$

$\tilde{X}$ is transformed into a linear transformation vector $\hat{X}$ through a vector v1 according to Equation 6. The dimension of data is reduced to an N×1 dimension by $\hat{X} \in \mathbb{R}^{N \times 1}$ according to Equation 6.

Through this process, the normalized normal data are respectively projected onto the principal component axis to be linearly transformed. That is, $\hat{X}$ corresponds to a value obtained by projecting $\tilde{X}$ onto the principal component axis.

In this case, the center point setting unit 120 sets an average value $\mu = E(\hat{X})$ of each of the projection points obtained by projecting the normalized normal data onto a center axis as a center point. That is, the center point setting unit 120 acquires center point coordinates by averaging all coordinates of a plurality of projection points obtained by the linear transformation unit 140.

FIG. 4 illustrates diagrams of results of setting a center point by projecting a normal data set onto a principal component axis in an embodiment of the present disclosure.

FIG. 4 illustrates a case where the number of features is 2 (M=2) for the sake of convenient description. Here, (a) of FIG. 4 illustrates a state in which a principal component axis P is acquired by performing PCA on normalized normal data. In addition, (b) of FIG. 4 illustrates a state in which a center point of the principal component axis is found by averaging coordinates of respective projection points obtained by projecting normalized normal data onto the principal component axis P.

Thereafter, whether or not data is abnormal is detected from the currently collected real-time sensed data by using analysis results of step S310 to step S320.

To this end, the input unit 130 receives the currently measured measurement data set from the plurality of IoT devices 10 in real time or periodically (S330).

Here, the input measurement data set may be normalized by the normalization unit 170 and then transmitted to the linear transformation unit 140. The normalization unit 170 normalizes the measurement data, which is each element of the measurement data set, by using mean and variance previously acquired from normal data of the same type as a relevant element.

Next, the linear transformation unit 140 projects a plurality of normalized measurement data, which is each element in the normalized measurement data set, onto the principal component axis, to acquire a linear transformation data set having a plurality of projection points as elements (S340). A projection method is described above with reference to FIG. 4.

In addition, the computation unit 150 calculates Mahalanobis distances between projection points which are respective elements in the linear transformation data set obtained in step S340 and the center point obtained in step S320 (S350).

Thereafter, the detection unit 160 compares the Mahalanobis distances obtained for each element with a preset threshold to detect whether or not data of each of IoT devices is abnormal (S360). In this case, when the calculated Mahalanobis distance is greater than the threshold, it is determined that the data of the IoT device corresponding to a relevant element is in an abnormal state, and when the calculated Mahalanobis distance is less than the threshold, it is determined that the data is in a normal state.

That is, according to the embodiment of the present disclosure, whether or not data of the IoT devices is abnormal may be detected by receiving real-time measurement data from the IoT devices and comparing a distance between a projection point acquired by projecting the measurement data onto a principal component axis and a center point with a threshold δ.

In the embodiment of the present disclosure, the Mahalanobis distance may be represented by Equation 7 below.

$$f_{MMD}(\hat{X}) = \sqrt{(\hat{X}-\mu)\text{cov}^{-1}(\hat{X})(\hat{X}-\mu)^T} \quad \text{Equation 7}$$

Here, $\hat{X}$ is a linear transformation data set having a plurality of projection points as elements, $\mu$ is a center point, $\text{cov}^{-1}(\hat{X}) = (\hat{X}-\mu)^T(\hat{X}-\mu)/N$, N is the number of samples of measurement data, and T is a transposed matrix.

$f_{MMD}(\hat{X})$ indicates how many times the standard deviation elements in the input data set $\hat{X}$ are away from an average value of normal data, that is, the center point $\mu$. Through this, it is possible to quantitatively measure how far the currently measured data is away from a normal range.

Here, $\mu$ used in Equation 7 corresponds to a reference value (average value) obtained from past normal data.

Therefore, in the present embodiment, whether the currently received sensed data is normal or abnormal may be quickly determined by simply comparing a Mahalanobis distance between a linear transformation value (projection point coordinates) obtained by projecting the currently received sensed data onto a principal component axis and a reference value (center point coordinates) previously acquired from the past normal data with the threshold δ.

The threshold δ is a threshold point for determining whether the data is abnormal or not, and a case where $f_{MMD}(\hat{X}) < \delta$ is determined to be abnormal. δ is a predefined constant value and may be determined based on a degree of dispersion of normal data when designing a system. Setting of the threshold may be performed after step S320.

According to Equation 7, unlike the existing Mahalanobis distance (MD), which uses an average of all past data as a reference value without distinguishing between normal data and abnormal data, the Mahalanobis distance is calculated by using an average obtained from only normal data as a reference value, and thus, reliability of an anomaly detection result using the computation may be increased. Hereinafter, Equation 7 is referred to as a modified Mahalanobis distance (MMD).

As described above, the anomaly detection technique according to the embodiment of the present disclosure designs only one principal component subspace based on PCA, linearly transforms data to reduce a dimension, measures an MMD of the linearly transformed data, and thus, when higher than the threshold, it is detected as abnormal.

Hereinafter, performance evaluation results of the proposed anomaly detection technology are described. For the sake of performance evaluation, a network data set collected from an Android device was used, and the data set includes 4704 normal data and 3141 abnormal data, and a total of 12 raw features were collected.

FIG. 5 is a diagram illustrating original data according to a raw feature used for a performance experiment according to the present disclosure. Normal data (circle) and abnormal data (triangle) are distributed with a considerable overlap, and thus, it may be seen that it is difficult to detect anomaly with a traditional rule-based to method.

FIG. 6 is a diagram illustrating a result of performing t-SNE in which data having a close distance is grouped by transforming the original data illustrated in FIG. 5 in a nonlinear method. It is confirmed that it is difficult to distinguish between normal data (gray) and abnormal data (black) although nonlinear transformation computation was performed.

In order to evaluate superiority of performance of the proposed method, a performance comparison with other four anomaly detection methods was performed.

TABLE 1

|  | F1 score | Recall | Accuracy | Specificity | Precision | MCC | Fall out |
|---|---|---|---|---|---|---|---|
| Proposed method (one-dimensional) | 0.907 | 0.928 | 0.924 | 0.922 | 0.888 | 0.844 | 0.078 |
| MMD (12-dimensional) | 0.839 | 1.000 | 0.846 | 0.744 | 0.723 | 0.733 | 0.256 |
| MD (one-dimensional) | 0.632 | 0.516 | 0.759 | 0.922 | 0.815 | 0.493 | 0.078 |
| Nonlinear transformation (one-dimensional) | 0.894 | 0.923 | 0.912 | 0.905 | 0.866 | 0.820 | 0.095 |
| Rule-based (one-dimensional) | 0.236 | 0.223 | 0.421 | 0.554 | 0.251 | 0.228 | 0.446 |

Here, MMD (12-dimensional) is obtained by performing anomaly detection by using the proposed MMD without dimension reduction by using $v \in \mathbb{R}^{12 \times 12}$ in a linear transformation process performed in Equation 6. MD (one-dimensional) is obtained by performing anomaly detection by using existing MD after dimension reduction by using $v_{(1)} \in \mathbb{R}^{12 \times 1}$ in the linear transformation process performed in Equation 6 like the proposed method.

Nonlinear transformation (one-dimensional) is obtained by performing anomaly detection by using the proposed MMD represented by Equation 7 for one-dimensional output data of an encoder part after an autoencoder model having a 12-1-12 dimensional structure using ELU which is a nonlinear function as an activation function is trained with normal data. Finally, Rule-based (one-dimensional) is a result of performing anomaly detection with only one raw feature that may best distinguish anomaly data from original data.

Seven performance evaluation indicators were used for performance evaluation, and a result thereof may be seen in Table 1. It may be seen that the proposed method generally has the best performance in all evaluation indicators. In addition, based on the fact that the MMD method of Equation 7 was also used for the nonlinear transformation (one-dimensional) method showing the second best performance, it may be seen that the proposed MMD method results in better anomaly detection than an MD method of the related art. Such performance improvement is obtained because a reference point for measuring MMD is determined as a center point of the normal data and is more accurately measured how far away from the normal range.

As described above, the present disclosure provides a low-complexity anomaly detection technology based on a one-dimensional linear transformation that may be applied to ultra-low specification IoT devices by applying MMD based on PCA. In particular, it may be confirmed by using network data collected from an Android device that the present disclosure has superior performance compared to other existing anomaly detection techniques despite a low computation amount.

According to the present disclosure described above, an anomaly detection technology may be implemented only with simple linear transformation, and thus, anomaly detection may be performed with low computation complexity even for ultra-low-spec devices such as IoT devices.

Although the present disclosure is described with reference to the embodiments illustrated in the drawings, which are only examples, and those skilled in the art will understand that various modifications and equivalent other embodiments are possible therefrom. Accordingly, the true technical protection scope of the present disclosure should be determined by the technical idea of the appended claims.

What is claimed is:

1. An anomaly detection method based on Internet of Things (IoT), the anomaly detection method comprising:
   searching for one principal component axis maximizing variance of data by analyzing a normal data set collected in time series from a plurality of IoT devices by using a principal component analysis technique;
   setting a center point of the principal component axis based on a result of projecting a plurality of normal data which is each element in the normal data set onto the principal component axis;
   receiving a currently measured measurement data set from the plurality of IoT devices;
   acquiring a linear transformation data set having a plurality of projection points as elements by projecting a plurality of measurement data which is each element in the measurement data set onto the principal component axis;
   calculating a Mahalanobis distance between the projection point which is each element in the linear transformation data set, and the set central point; and
   detecting whether or not data of the IoT devices is abnormal by comparing the Mahalanobis distance calculated for each element with a threshold.

2. The anomaly detection method of claim 1,
   wherein, in detecting whether or not data of each of the IoT devices is abnormal, when the calculated Mahalanobis distance is greater than the threshold, data of the IoT devices corresponding to a relevant element is determined to be in an abnormal state.

3. The anomaly detection method of claim 1,
   wherein, in setting the center point, an average value of projection points obtained by projecting normal data which is each element in the normal data set onto the principal component axis is set as a center point of the principal component axis.

4. The anomaly detection method of claim 1, further comprising:
   normalizing the measurement data which is each element of the measurement data set by using mean and variance previously acquired from normal data of the same type as a corresponding element,
   wherein, in acquiring the linear transformation data set, the linear transformation data set is acquired by projecting the normalized measurement data onto the principal component axis.

5. The anomaly detection method of claim 4,
   wherein, in searching for the principal component axis, after the normal data which is each element included in the normal data set is normalized by using the mean and variance of the normal data of the same type as the corresponding element, the normalized normal data set is analyzed by using the principal component analysis technique.

6. The anomaly detection method of claim 1,
   wherein, in calculating the Mahalanobis distance, the Mahalanobis distance is calculated by using following equation:
   $$f_{MMD}(\hat{X}) = \sqrt{(\hat{X}-\mu)\mathrm{cov}^{-1}(\hat{X})(\hat{X}-\mu)^T}$$
   where $\hat{X}$ is the linear transformation data set having a plurality of projection points as elements, $\mu$ is the center point, $\mathrm{cov}^{-1}(\hat{X}) = (\hat{X}-\mu)^T(\hat{X}-\mu)/N$, N is the number of samples of the measurement data, and T is a transposed matrix.

7. An anomaly detection apparatus based on IoT, the anomaly detection apparatus comprising:
   a principal component analysis unit configured to search for one principal component axis maximizing variance of data by analyzing a normal data set collected in time series from a plurality of IoT devices by using a principal component analysis technique;
   a center point setting unit configured to set a center point of the principal component axis based on a result of projecting a plurality of normal data which is each element in the normal data set onto the principal component axis;
   an input unit configured to receive a currently measured measurement data set from the plurality of IoT devices;
   a linear transformation unit configured to acquire a linear transformation data set having a plurality of projection points as elements by projecting a plurality of measurement data which is each element in the measurement data set onto the principal component axis;

a computation unit configured to calculate a Mahalanobis distance between the projection point which is each element in the linear transformation data set, and the set central point; and a detection unit configured to detect whether or not data of the IoT devices is abnormal by comparing the Mahalanobis distance calculated for each element with a threshold.

8. The anomaly detection apparatus of claim 7,
wherein the detection unit determines that data of the IoT devices corresponding to a relevant element is determined to be in an abnormal state when the calculated Mahalanobis distance is greater than the threshold.

9. The anomaly detection apparatus of claim 7,
wherein the center point setting unit sets, as a center point of the principal component axis, an average value of projection points obtained by projecting normal data which is each element in the normal data set onto the principal component axis.

10. The anomaly detection apparatus of claim 7, further comprising:

a normalization unit configured to normalize the measurement data which is each element of the measurement data set by using mean and variance previously acquired from normal data of the same type as a corresponding element, wherein the linear transformation unit acquires the linear transformation data set by projecting the normalized measurement data onto the principal component axis.

11. The anomaly detection apparatus of claim 10,
wherein the normalization unit normalizes the normal data which is each element included in the normal data set by using the mean and variance of the normal data of the same type as the corresponding element, and wherein the principal component analysis unit analyzes the normalized normal data set by using the principal component analysis technique.

12. The anomaly detection apparatus of claim 7,
wherein the computation unit calculates the Mahalanobis distance by using following equation:

$$f_{MMD}(\hat{X}) = \sqrt{(\hat{X}-\mu)\mathrm{cov}^{-1}(\hat{X})(\hat{X}-\mu)^T}$$

where $\hat{X}$ is the linear transformation data set having a plurality of projection points as elements, $\mu$ is the center point, $\mathrm{cov}^{-1}(\hat{X}) = (\hat{X}-\mu)^T(\hat{X}-\mu)/N$, N is the number of samples of the measurement data, and T is a transposed matrix.

* * * * *